United States Patent [19]

Bouse

[11] 4,036,207
[45] July 19, 1977

[54] WATER HEATING ASSEMBLY

[75] Inventor: Clyde W. Bouse, Clearwater, Fla.

[73] Assignee: General Energy Devices, Clearwater, Fla.

[21] Appl. No.: 639,983

[22] Filed: Dec. 11, 1975

[51] Int. Cl.² .............................................. F23J 3/02
[52] U.S. Cl. ................................................... 126/271
[58] Field of Search ................ 126/270, 271; 237/1 A

[56] References Cited

U.S. PATENT DOCUMENTS

| 1,853,480 | 4/1932 | Wheeler et al. | 126/271 |
| 2,467,885 | 4/1949 | Freund | 126/271 |
| 2,553,302 | 5/1951 | Cornwall | 126/271 |
| 2,608,968 | 9/1952 | Moseley | 126/271 |
| 2,636,129 | 4/1953 | Agnew | 126/271 |
| 2,705,948 | 4/1955 | Rostock | 127/271 |
| 2,907,318 | 10/1959 | Awot | 126/271 |
| 3,299,881 | 1/1967 | Koch | 126/271 |

Primary Examiner—Kenneth W. Sprague
Attorney, Agent, or Firm—Stefan M. Stein

[57] ABSTRACT

A solar water heating assembly utilizing a heat collector in a fluid communication and water delivery to and from a primary and/or auxiliary water storage tank. The heat collector unit includes a collector plate mounted within an insulated casing and includes water filled conduit integrally formed thereon and disposed in fluid communication with a primary heater conduit assembly having a plurality of heat collector elements mounted in predetermined relation thereon so as to initiate heating of the water or liquid entering the tubing wherein heat is gathered from the interior of the casing in which the tubing and primary heating unit are both mounted. The primary heater conduit is disposed in insulated relation to the collector unit wherein the collector unit is mounted in spaced relation to the bottom of the casing. A heat sensing element is mounted on the assembly in temperature gauging relation to the water passing therethrough and further being electrically connected to a pump element which forces water circulation between the heat collector unit and the primary and/or auxiliary water storage tank.

15 Claims, 7 Drawing Figures

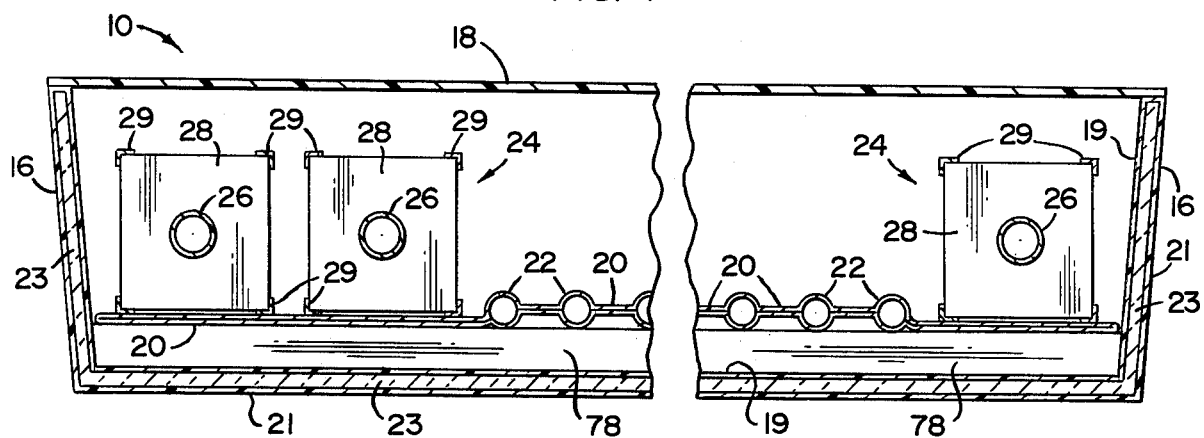
FIG. 4
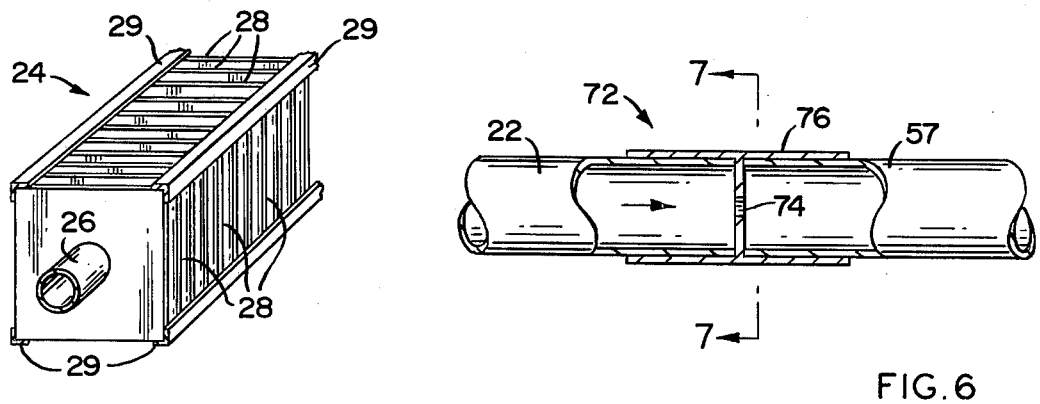
FIG. 5
FIG. 6
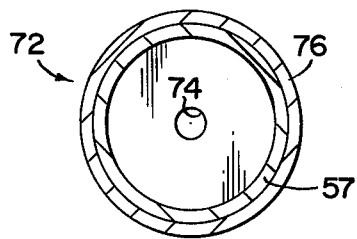
FIG. 7

WATER HEATING ASSEMBLY

BACKGROUND OF THE INVENTION

1. Field of the Invention

A solar water heater of the type utilizing a collector unit having a primary heating structure disposed in fluid communication with a main collector plate disposed in exposed relation to the sun's rays.

2. Description of the Prior Art

Solar heating systems have long been known as a method of obtaining hot water or other fluids without the use of traditional fuels. Generally, such heating systems have been utilized for the purpose of attempting to stave heating costs by eliminating the need for such traditional fuels or at least reducing the actual quantity of usage. Numerous prior art systems have been utilized by the industry and are also now commercially available.

However, even though solar heating systems have been known and been in practice for some time, there are recognized inherent disadvantages found in these prior art systems. Many of these known devices are generally not self-contained and fluid flow through the entire system is primarily dependent upon line pressure of the fluid to force the fluid through the coils of the heat exchanger. Obvious problems arise when the line pressure is not sufficient to overcome the pressure forcing the fluid through the various tubing comprising the heat exchanger since tubing is generally of a restricted diameter of transverse dimension relative to conventional piping.

Perhaps the greatest problem associated with prior art or known solar heating systems is efficiency of operation or performance capabilities. This problem of inefficiency is generally blamed on a number of structural features of the prior art systems ranging from improper insulation to inefficient heat collecting plates, etc.

Generally, the basic structure of known solar heating systems includes some type of collector plate exposed to the direct rays of the sun wherein the collector plate comprises tubing through which the water or liquid to be heated flows. Theoretically, the sun's energy is absorbed into the coils in the form of heat and transferred to the liquid. The liquid is then stored in a storage tank of normal conventional design. A number of the existing systems further cause forced circulation to occur on a constant or periodic basis dependent upon the temperature of the water desired and the difference in this temperature from the water being maintained in any storage tank or facility. While functional, this type of arrangement does not always result in maximum operating efficiency.

Another problem commonly present in the prior art and recognized in the heating industry is the existence of temperature sensors which are forced to be located in direct contact with the fluid flow and which therefore impair the flow of fluid through the coils. Temperature sensors are also utilized in prior art devices as mechanical means to regulate the flow of fluid dependent upon the particular desired temperature or the range of temperatures intended for adequate operation of the system. In order to accomplish more efficient results, the temperature sensors frequently are designed to an overly complex state. Such relatively sophisticated sensors are designed to rely upon expansion of metals to accomplish control of fluid flow depending upon the temperature change of the fluid and accordingly, in the tubing through which the fluid is directed. In addition, problems frequently arise from the fluid being heated in the exchanger which contains chemicals which are deposited around the flow valve associated within the sensing apparatus causing the valve to become inoperable. Overall, the complexity of such prior art systems generally produces overly expensive devices which are costly to purchase and maintain and which have questionable operating characteristics.

It is recognized that an efficient functional and reliable solar heating system would be quite desirable in the heating industry.

SUMMARY OF THE INVENTION

This invention relates to a solar water heating assembly including a heat collector means disposed in fluid communication with water storage means in the form of a primary and/or an auxiliary storage tank wherein water is forced in fluid flow to and from the heat collector unit relative to the water storage assembly.

More particularly, the heat collector unit comprises a casing which may be made from a fiberglass material and has a collector plate mounted therein. The collector plate has conduit means formed thereon in integral relation with the remainder of the plate. The plate is made from copper or like heat conductive material and disposed in direct exposure to the sun's rays entering the casing through a facing means. The collector plate is mounted on the casing interior in spaced relation to the bottom thereof so that air within the casing can circulate about the collector plate.

The facing means itself may be made of a fiberglass like material known and commercially available in the industry as Solar Glass. An important structural feature of the present invention is the formation of the facing sheet or facing means from a translucent material such as the aforementioned Solar Glass.

The heat collector unit further comprises a primary heater means defined by continuous conduit having a predetermined length and disposed upstream of and in direct fluid communication with the tubing. A plurality of heat collector elements are disposed in spaced relation to one another on the conduit. The heat collector means includes fin elements preferably disposed in transverse relation to the longitudinal axis of the conduit and extending along at least a major portion thereof. While the major portion of each fin element is disposed in spaced relation to one another, the corners thereof may be joined by plastic interconnecting means. This interconnecting means further serves to maintain the primary heater in spaced or "insulated" relation relative to the collector plate so as to prevent heat transfer therebetween. These fin elements extend outwardly into the interior of the casing or space defined thereby and serve to "absorb" heat and conduit it to the water or fluid passing on the interior of the conduit of the primary heater. Accordingly, the water is "preheated" before entering the conduit associated directly with the collector plate as described above. A pump means is disposed in the path of fluid flow taken by the water passing through the tubing of the heat collector means and serves as the driving force of the water passing through the system.

A sensing means is mounted in direct engagement with the tubing and more specifically is disposed in temperature sensing relation to the water passing therethrough. This sensing means may be of conventional design but is electrically interconnected to the pump means so as to activate the pump and force fluid flow through the entire system to and from the heat collector means to the storage assembly.

Another structural feature of the present invention includes a vent valve mounted on the casing and connected in fluid communication to either the primary heater conduit or the conduit of the collector plate. This vent valve serves as a one way air valve allowing any air trapped within the primary or collector plate conduit to be vented to atmosphere rather than be circulated throughout the system.

In addition to the above, a positive shut-off valve is positioned in the path of fluid flow immediately adjacent the entrance of the water to the collector plate. This valve is connected so as to stop flow of fresh water into the collector plate once the temperature of the water throughout the system has essentially equalized. More specifically, this positive shut-off valve will close to allow fluid flow once the water in the storage facility has reached a sufficient temperature or once sufficient heat is not being transferred from the collector plate to the water being returned to the storage facility.

The storage assembly itself may comprise a main or primary storage tank of conventional design interconnected to the heat collector means or collector plate thereof by conventional piping. Valving means may be interposed in this piping so as to regulate or establish on/off flow between the collector plate and the primary storage. A fresh source of water is disposed in communicating relation to the interior of the main storage tank. Similarly, an outlet from the main storage tank or facility is directed to the residence or other facility designed to be serviced by the water heating assembly of the present invention.

Yet another embodiment of the present invention comprises an auxiliary storage facility in terms of a storage tank disposed in fluid communication between the collector plate and the main or primary storage facility. In this embodiment, the delivery of the hot water to the domestic residence or other facility which the assembly was designed to service, may be connected directly to the auxiliary source wherein the source of "cold" water supply may be directed to the primary storage tank. Piping of substantially conventional design and associated valving may be disposed in intercommunicating relation between the collector plate, the auxiliary storage tank and the primary storage tank as well as the supply of cold water to the system and removal of heated water from the system.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 4 is a section view showing details of the casing and the structural elements therein.

FIG. 5 is an end, sectional view of the collector plate.

FIG. 6 is a detail, partial cutaway view of heat collector elements and their relation to the primary heater conduit.

FIG. 7 is a detail view in section of the liquid flow regulator of the present invention.

Similar reference characters refer to similar parts throughout the several views of the drawings.

DETAILED DESCRIPTION

Figure 1:
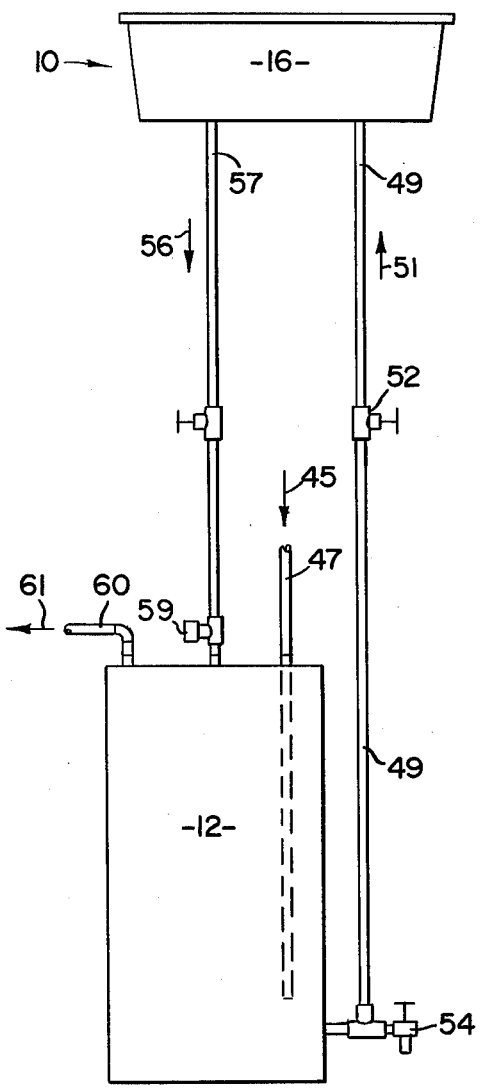
FIG. 1 is a substantially schematic view of the heat collector means in fluid communication with a main storage facility or tank.
Figure 2:
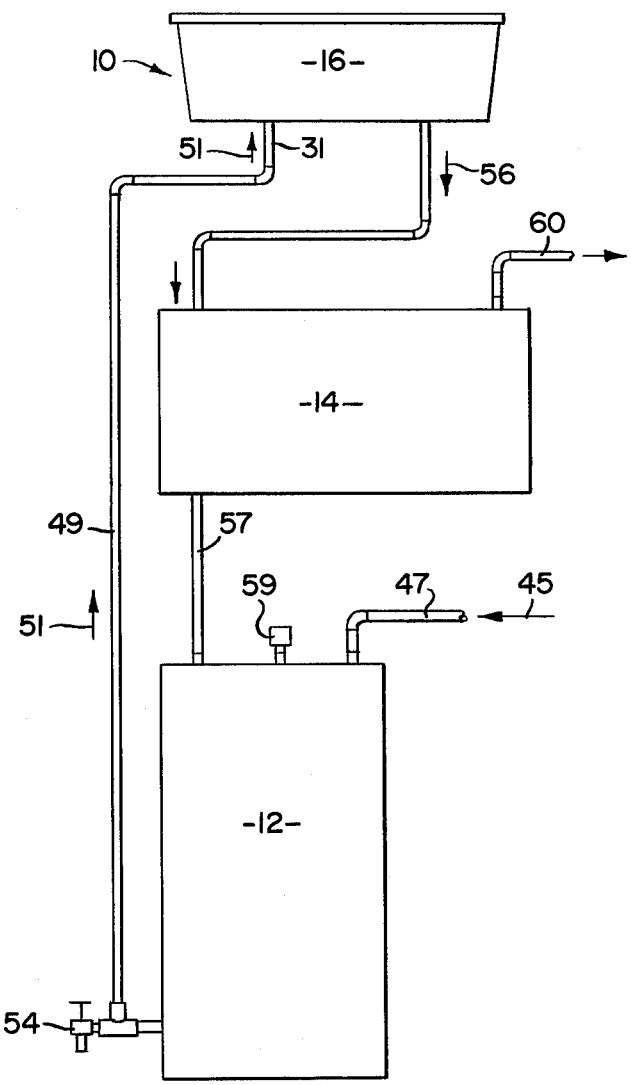
FIG. 2 is a schematic representation of the heat collector means of the present invention in fluid communication with both an auxiliary water storage facility and a main water storage facility.
Figure 3:
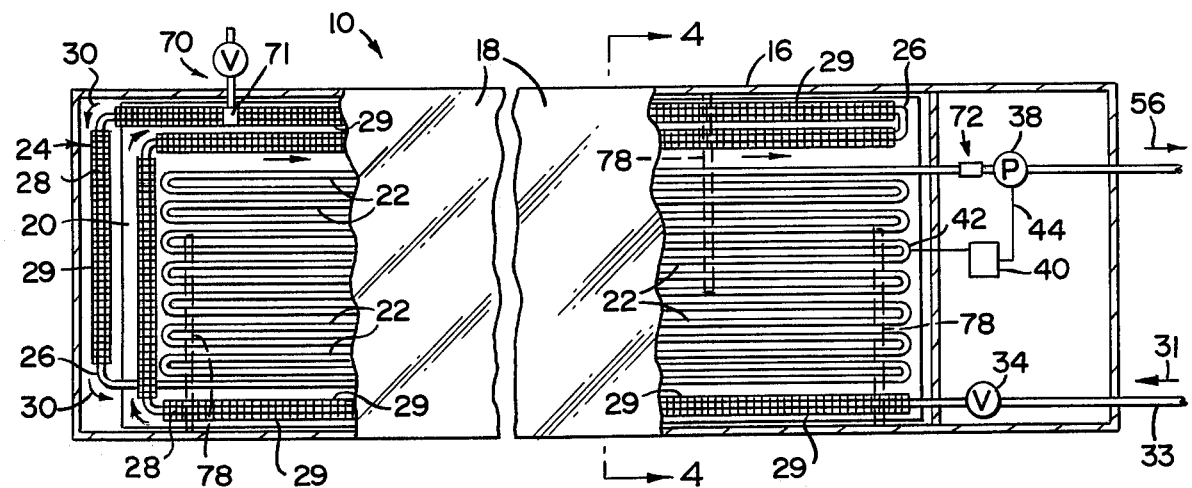
FIG. 3 is a top view and partial cutaway showing the interior and structural details of the heat collector means including the relationship of the primary heater means relative thereto.

As shown in FIGS. 1 through 3, the heater collector means generally indicated as 10 is interconnected in fluid communication to a main storage tank 12 by conventional piping which will be explained in detail hereinafter. FIG. 2 represents yet another embodiment of the present invention wherein the heat collector means 10 is interconnected in fluid communication to an auxiliary storage tank 14 and a main storage tank 12.

More specifically, the heater collector means comprises an outer casing 16 including an insulated fiberglass or like material construction described in greater detail hereinafter with reference to FIG. 4. The casing 16 includes a front facing means 18 made from a panel of translucent material having a substantially fiberglass composition known as Solar Glass in the industry. Facing means 18 covers at least the "front" or exposed surface portion of casing 16 which covers the collector plate means 20. The facing means 18 is oriented to be disposed in direct exposed relation to the sun's rays. The collector plate means 20 has integrally formed thereon a continuous length of conduit 22 made from copper or like heat conductive material. See FIG. 5.

The water heating assembly of the present invention further comprises a primary heater means generally indicated as 24. The primary heater means (FIG. 6) comprises a continuous length of conduit 26 mounted on the interior of the casing 16, upstream and in fluid communication with the conduit 22. A plurality of heat collector elements 28 are mounted on the exterior of the conduit 26. The plurality of heat collector elements may be in the form of fin means mounted on the exterior surface of the conduit 26 in spaced relation to one another and projecting outwardly therefrom into the space defined on the interior of the casing 16. More specifically, a preferred embodiment of the present invention comprises the plurality of fin means arranged in substantially transverse relation to the longitudinal axis or direction of fluid flow through the interior of the conduit 26. Directional arrows 30 define the direction of the path of travel of the fluid flow as it passes through the system between the conduit 26 and conduit 22. The length of the conduit 26 should be such as to accomplish "maximum" or at least optimum rise in temperature of the incoming fluid from fluid inlet pipe 33 as indicated by directional arrow 31.

With reference to FIGS. 4 and 6, the primary heater means 24 further includes insulating means in the form of elongated strips 29 attached to each of the correspondingly positioned corners of each of the fin means so as to substantially surround the peripheral portions of the corners. Therefore, as shown, one insulation strip extends along and engages each of the successively and correspondingly positioned portion of each fin means mounted on the conduit 26. By virtue of the presence of insulation, the primary heater means 24 is insulated from heat transfer to the collector plate 20 on which the fin means or heat collector elements are pre-mounted.

Other structural features of the present invention include a main control valve 34 in the form of a positive shut-off valve disposed immediately upstream and adjacent to the point of entry of the inlet pipe 33 to the interior of the casing and more specifically to the conduit 26 comprising the primary heater means. The valve, of course, determines fluid flow into the collector plate 20 from the "cold" portion of the storage tank 12 or 14. Upon activation, proper disposition of the liquid is maintained as desired upon activation of the pump means 38 as will be explained in greater detail hereinafter.

A sensing means 40 is attached directly to conduit 22 as at point 42 for the purpose of determining the temperature of the fluid passing within the tubing. The sensing means 40 itself may be of relatively conventional design of the type capable of determining the temperature of fluid within predetermined perameters. Similarly, the sensing means 40 may be electrically interconnected by connection 44 to the main pump 38 for purposes of activation and deactivation of the pump dependent upon the temperature within the units and/or main storage area and auxiliary storage area 12 and 14 respectively.

With reference to FIG. 3, other structural features of the present invention include vent valve means generally indicated as 70 attached to casing 16 and interconnected as at 71 in fluid communication to the path of water passing through either the primary heater means conduit 26 or the conduit of the collector plate 22. By virtue of this connection, any air trapped in the flow line is released by means of the one way vent valve which passes the air to atmosphere. The water passing through the various conduits is of course maintained within the system as intended.

With further reference to FIG. 3 and in addition, FIG. 7, a fluid flow regulator means generally indicated as 72 is disposed downstream of the point where the water within the heat collector means leaves the collector plate. This flow regulator means may be in the form of a simple venturi wherein water passing through the terminal end of conduit 22 passes into the outlet pipe 57 through a restricted aperture 74 of predetermined dimension. This predetermined dimension defines a venturi whereby the rate of fluid flow into the storage facility from the collector plate is regulated to any practical and desired amount. The conduit 22 and the outlet pipe 57 may be joined at the point of venturi aperture 74 by conventional sleeve means 76 or any other connector applicable to achieve efficient operation as described above.

With reference to FIGS. 3 and 4, further structural features of the present invention include the provision of support spacers 78 secured to the bottom or base of casing 16 in staggered, offset relation to one another. The specific disposition of the spacer support 78 is such as to allow the collector plate 20 to be mounted thereon in supported relation thereto. By virtue of this arrangement, the collector plate 20 with the conduits 22 and primary heating means 24 mounted thereon, stands in spaced relation to the bottom or base 19 of the casing 16. This spaced supported relation of the collector plate relative to the casing allows for the air on the interior of the casing to freely circulate about the collector plate and primary heating means thereby having the added advantage of allowing the collector plate and primary heating means to gather heat from this air since it too is exposed in direct relation to the sun's rays, through the translucent facing 18.

Further, the structure of the casing itself is such as to provide for an inner and outer "shell" or layer of fiberglass material having an insulated layer formed therebetween in substantially sandwiched relation to the inner and outer layer. As best shown in FIG. 4, an inner and outer layer 19 and 21 respectively, are disposed on opposite sides of the central insulating layer 23 so as to reduce as much as possible, escape of the heat built up within the interior of the casing 16.

With reference to FIG. 1 operation of the water heating system of the present invention comprises in flow of cold water from a conventional supply as indicated by directional arrows 45 through piping 47. Preferably, the length of tube 47 extends to a predetermined depth within the interior of the tank 12 as indicated. Water flows from the interior of the tank through piping 49 to the heat collecting means generally indicated as 10 wherein the fluid flow is indicated by directional arrow 51. From the conduit 49 they have formed therein a gate valve 52 so as to manually regulate fluid flow from the main storage facility 12 to the casing or heating collecting means 10. A take-off or bib valve 54 may be secured in substantially adjacent relation to the point of junction of the piping 49 and the main storage facility 12. With reference to FIG. 3, the fluid inlet 33 may be disposed in direct communication with the piping 49 wherein fluid flow in FIG. 3 is represented by directional arrow 31 as set forth above. The liquid or fluid passing through conduit 33 past main control valve 34 passes into the conduit 26 where it is initially exposed to the heat collected by the heat collector elements in the form of fin means 28 as also set forth above. Directional flow through conduit 26 and into the conduit 22 is indicated by the directional arrows 30 as shown. After passing through the entire conduit 22, the pump 38, upon activation, again forces the heated water from the casing 16 and the conduit 22 as indicated by directional arrow 56. Piping 57 is represented as establishing fluid communication between the heating collector means 10 and the main storage 12. A pressure release valve 59 may be disposed immediately adjacent the entrance of the fluid into the main storage facility 12. Piping 60 represents the fluid takeoff from the main storage tank 12 to domestic use as indicated by directional arrows 61 or as it passes to the various facilities for which the water heating assembly of the present invention was designed to service.

With respect to FIG. 2, operation and flow of the system is essentially the same wherein input of cold water from a conventional source passes through piping 47 as indicated by directional arrow 45 into a main storage tank 12. Takeoff therefrom serves to direct the water from the main storage tank 12 through piping 49 as indicated by directional arrow 51 and to the heat collector means 10 including primary heating means 24 and conduit 22 as set forth above. The embodiment of the heat collector means 10, as shown in FIG. 3, may be used with either of the embodiments of FIGS. 1 and 2. After heating, water passes through outlet pipe 57 as indicated by directional arrow 56 into auxiliary storage facility or tank 14. Water takeoff may be directed to domestic use through outlet pipes 60 as indicated by directional arrow 61. Alternately, the water flows into the main storage tank 12 from the auxiliary tank 14.

It will thus be seen that the objects made apparent from the preceding description are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features herein described, and all statements of the scope of the invention which, as a matter of language, might be said to fall therebetween.

Now that the invention has been described,

What is claimed is:

1. A water heating assembly of the type energized by solar energy, said assembly comprising: water storage means, heat collector means including a casing having facing means, said heat collector means further comprising a collector plate including water filled conduit means disposed relative to said casing, said conduit means being disposed in fluid communication with said storage means, primary heater means mounted in fluid communication with said conduit means of said collector plate, said primary heater means including a plurality of heat collector elements mounted in spaced relation along at least a portion of the length of said conduit means, pump means disposed in fluid driving relation between said heat collector means and said water storage means, insulating means disposed between said plurality of heat collector elements and said collector plate whereby said primary heater means is supported by and substantially insulated from direct contact with said collector plate; and said facing means being disposed relative to said casing for transmitting solar radiation to said heat collector means when said facing means is exposed to the source of solar energy.

2. A water heating assembly as in claim 1 wherein said primary heater comprises conduit means of predetermined length disposed within said casing and interconnected between said collector plate conduit and said water storage means and upstream of said collector plate conduit, whereby the water entering said collector plate conduit is preheated above ambient temperature.

3. A water heating assembly as in claim 1 wherein each of said heat collector elements comprise fin means disposed in outwardly extending relation to said conduit means in protruding relation to the space within and defined by said casing.

4. A water heating assembly as in claim 1 wherein said insulating means comprises at least one strip member attached to corresponding portions of successively positioned fin means.

5. A water heating assembly as in claim 3 wherein said fin means is mounted on the exterior of said conduit means in substantially transverse relation to the longitudinal axis thereof.

6. A water heating assembly as in claim 3 wherein said fin means are formed from heat conductive material, and disposed in spaced relation to one another along at least a major portion of the length of said conduit means, whereby said fin means collect heat from the interior of said casing and convey it to said conduit means and the water therein.

7. A water heating assembly as in claim 1 wherein said facing means is formed from a translucent material and is mounted on said casing.

8. A water heating assembly as in claim 7 wherein said casing is formed at least in part from a fiberglass material.

9. A water heating assembly as in claim 1 including sensing means connected to said heat collector means and electrically interconnected to said pump means, whereby actuation of said pump means is regulated by said sensing means dependent upon the temperature of the water within said collector plate conduit.

10. A water heating assembly as in claim 1 further comprising valving means interconnected between said heat collector means and said water storage means and comprising control valve means, said control valve means in fluid regulating position adjacent and input to said casing and heat collector means.

11. A water heating assembly as in claim 10 wherein said control valve means comprises a positive shut-off valve positioned to regulate flow of liquid from said water storage means.

12. A water heating assembly as in claim 1 further comprising flow regulator means disposed downstream of said collector plate and upstream of said water storage means.

13. A water heating assembly as in claim 12 wherein said flow regulator means comprises a flow restricting aperture in fluid communication with water passing through said assembly, said flow restricting aperture is formed of a predetermined dimension, whereby rate of fluid flow therethrough is regulated.

14. A water heating assembly as in claim 1 further comprising vent valve means interconnected to said assembly in fluid communication to the flow of fluid through said assembly, whereby air passing along the path of fluid flow is vented to atmosphere.

15. A water heating assembly as in claim 1 wherein said collector plate is mounted within said casing in spaced relation to the base thereof, whereby air within said casing is allowed to pass around said collector plate.

* * * * *

UNITED STATES PATENT OFFICE
CERTIFICATE OF CORRECTION

Patent No. 4,036,207          Dated July 19, 1977

Inventor(s) Clyde W. Bouse

It is certified that error appears in the above-identified patent and that said Letters Patent are hereby corrected as shown below:

In the Abstract - Line 2 - delete "a"

Column 2, line 55, "conduit" should read -- conduct --.

Signed and Sealed this

Eighth Day of November 1977

[SEAL]

Attest:

RUTH C. MASON         LUTRELLE F. PARKER
*Attesting Officer*      *Acting Commissioner of Patents and Trademarks*